(12) United States Patent
Gallo et al.

(10) Patent No.: US 9,514,067 B2
(45) Date of Patent: Dec. 6, 2016

(54) INTERFACE ARBITRATION FOR A WIRED TAG

(75) Inventors: Francesco Gallo, Gratkorn (AT); Paul Bakker, Eindhoven (NL)

(73) Assignee: NXP B.V., Eindhoven (NL)

( * ) Notice: Subject to any disclaimer, the term of this patent is extended or adjusted under 35 U.S.C. 154(b) by 146 days.

(21) Appl. No.: 13/600,832

(22) Filed: Aug. 31, 2012

(65) Prior Publication Data

US 2014/0062661 A1 Mar. 6, 2014

(51) Int. Cl.
*G06F 13/16* (2006.01)
*G06K 19/077* (2006.01)

(52) U.S. Cl.
CPC ..... *G06F 13/1605* (2013.01); *G06K 19/07769* (2013.01); *G06F 2213/0016* (2013.01)

(58) Field of Classification Search
CPC ................................................ G06K 19/07769
USPC ....... 340/10.1, 10.3; 711/149, 151, 152, 158
See application file for complete search history.

(56) References Cited

U.S. PATENT DOCUMENTS

| | | | | |
|---|---|---|---|---|
| 5,206,495 | A * | 4/1993 | Kreft .............................. | 235/492 |
| 6,045,043 | A * | 4/2000 | Bashan et al. ................. | 235/441 |
| 6,105,874 | A * | 8/2000 | Berger et al. .................. | 235/492 |
| 7,789,313 | B2 * | 9/2010 | Degauque et al. ............ | 235/492 |
| 8,108,307 | B1 * | 1/2012 | Kawan et al. .................. | 705/41 |
| 8,453,939 | B2 * | 6/2013 | Lee .............................. | 235/492 |
| 8,505,828 | B2 | 8/2013 | Cho | |
| 2005/0280511 | A1 | 12/2005 | Yokoyama et al. | |
| 2006/0186211 | A1 * | 8/2006 | Kim et al. ..................... | 235/492 |
| 2006/0206343 | A1 * | 9/2006 | Nakanishi et al. ............... | 705/1 |
| 2006/0208066 | A1 * | 9/2006 | Finn et al. ..................... | 235/380 |
| 2009/0043920 | A1 | 2/2009 | Kuris et al. | |
| 2009/0137276 | A1 * | 5/2009 | Baldischweiler et al. .... | 455/558 |
| 2010/0029202 | A1 * | 2/2010 | Jolivet et al. ................ | 455/41.1 |
| 2010/0240318 | A1 * | 9/2010 | Tomoeda ........................ | 455/68 |
| 2011/0113210 | A1 * | 5/2011 | Klapman et al. ............. | 711/163 |
| 2011/0213938 | A1 * | 9/2011 | Kuris et al. ................... | 711/158 |
| 2012/0024964 | A1 | 2/2012 | Lee | |

FOREIGN PATENT DOCUMENTS

| | | |
|---|---|---|
| CN | 1637780 A | 7/2005 |
| CN | 1710604 A | 12/2005 |
| CN | 101315660 A | 12/2008 |
| WO | WO 98/29830 A1 | 7/1998 |

OTHER PUBLICATIONS

NFC Forum "NFC Data Exchange Format (NDEF)" Technical Specification.

(Continued)

*Primary Examiner* — Andrew Bee

(57) ABSTRACT

Various exemplary embodiments relate to an integrated circuit (IC) including: a memory; a radio frequency (RF) interface configured to access the memory; a wired interface connected to a host and configured to access the memory; and an arbitration module configured to prevent concurrent access to the memory by more than one interface. Various exemplary embodiments relate to a method of controlling access in a dual interface tag having a wired interface and a radio frequency (RF) interface operable in an idle state, a wired lock state, and a RF locked state.

19 Claims, 4 Drawing Sheets

(56) References Cited

OTHER PUBLICATIONS

NFC Forum Technical Specification "Type 1 Tag Operational" v.1.1.
NFC Forum Technical Specification "Type 2 Tag Operational" v.1.1.
NFC Forum Technical Specification "Type 3 Tag Operational" v.1.1.
NFC Forum Technical Specification "Type 4 Tag Operational" v.2.0.
NFC Forum Technical Specification "Connection Handover" v1.2.
NFC Forum, Bluetooth SIG Application Document "Bluetooth Secure Simple Pairing Using NFC".
First Chinese Office Action to CN Application No. 201310358959.8 dated Jan. 7, 2016.
First Chinese Office Action to counterpart CN Application 201310358959.8 dated Jan. 7, 2016.

* cited by examiner

INTERFACE ARBITRATION FOR A WIRED TAG

TECHNICAL FIELD

Various exemplary embodiments disclosed herein relate generally to contactless cards and contactless tags.

BACKGROUND

Contactless tags are used in identification products such as smart cards and Radio Frequency Identification (RFID) tags for a variety of purposes. International standard ISO14443A is the industry standard for contactless smart cards. ISO14443A compliant products provide RF communication technology for transmitting data between a card or tag and a reader device.

Near Field Communication (NFC) is a very short-range wireless technology for distances measured in centimeters. NFC is optimized for intuitive, easy and secure communications between various devices without user configuration. NFC is compatible with contactless smart card platforms. NFC devices can operate like a contactless smart card, making them compatible with ISO14443A compliant systems. Such functionality is called card emulation.

The NFC Forum is a non-profit industry association advancing the use of NFC short-range wireless interaction in a variety of devices. The NFC Forum provides a number of technical specifications defining the operation of NFC devices. The NFC Forum has defined specifications for contactless cards called NFC Forum tags.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to an integrated circuit (IC) including: a memory; a radio frequency (RF) interface configured to access the memory; a wired interface connected to a host and configured to access the memory; and an arbitration module configured to prevent concurrent access to the memory by more than one interface.

In various embodiments the IC of further includes a field detection (FD) pin that indicates whether an RF field is present.

In various embodiments, the arbitration module comprises: a first register configured to indicate the status of the RF interface and a second register configured to indicate the status of the wired interface.

In various embodiments, the arbitration module is configured to block communication via the wired interface if the first register indicates that the RF interface is active and to block communication via the RF interface if the second register indicates that the wired interface is active.

In various embodiments, the arbitration module is configured to set the first register when the FD pin indicates that an RF field is present.

In various embodiments, the arbitration module waits until the second register indicates that the wired interface is inactive before blocking the wired interface.

In various embodiments, the arbitration module is configured to reset the first register when the field detection pin indicates that no RF field is present.

In various embodiments, the arbitration module is configured to control the first register based on commands received via the RF interface.

In various embodiments, the arbitration module is configured to control the second register based on an address received via the wired interface.

In various embodiments, the arbitration module is configured to control the second register based on commands received via the wired interface.

In various embodiments, the wired interface is a integrated inter-circuit ($I^2C$) interface.

Various exemplary embodiments relate to a method of controlling access in a dual interface tag having a wired interface and a radio frequency (RF) interface operable in an idle state, a wired lock state, and a RF locked state. The method includes: transitioning from an idle state to a wired lock state based on a first command received via the wired interface; transitioning from a wired lock state to an idle state based on a second command received via the wired interface or a lack of power on the wired interface; transitioning from an idle state to an RF locked state based on a status of the RF interface; and transitioning from an RF locked state to an idle state based on a status of the RF interface.

In various embodiments, the method further includes transitioning from a wired lock state to an RF locked state based on detection of an RF field.

In various embodiments, the status of the RF interface is based on the presence of an RF field.

In various embodiments, the status of the RF interface is based on commands received via the RF interface.

In various embodiments, the step of transitioning from an idle state to an RF locked state based on a status of the RF interface comprises setting a register associated with the RF interface based on the presence of a RF field.

In various embodiments, the step of transitioning from an idle state to a wired lock state based on a first command received via the wired interface includes: receiving an address via the wired interface; determining that the address is a slave address of the tag on the wired interface; and setting a register associated with the wired interface to indicate that the wired interface is busy.

In various embodiments, the step of transitioning from an RF locked state to an idle state is based on a status of the RF interface includes: receiving a HALT message via the RF interface; and resetting a register associated with the RF interface to indicate that the RF interface is not busy.

It should be apparent that, in this manner, various exemplary embodiments enable a dual interface tag and method of controlling access to the dual interface tag. In particular, by locking access to the first interface that attempts to access the tag, an arbitration module may enable access via at least two interfaces and prevent corruption of data stored on the tag.

BRIEF DESCRIPTION OF THE DRAWINGS

In order to better understand various exemplary embodiments, reference is made to the accompanying drawings, wherein.

DETAILED DESCRIPTION

Figure 1:
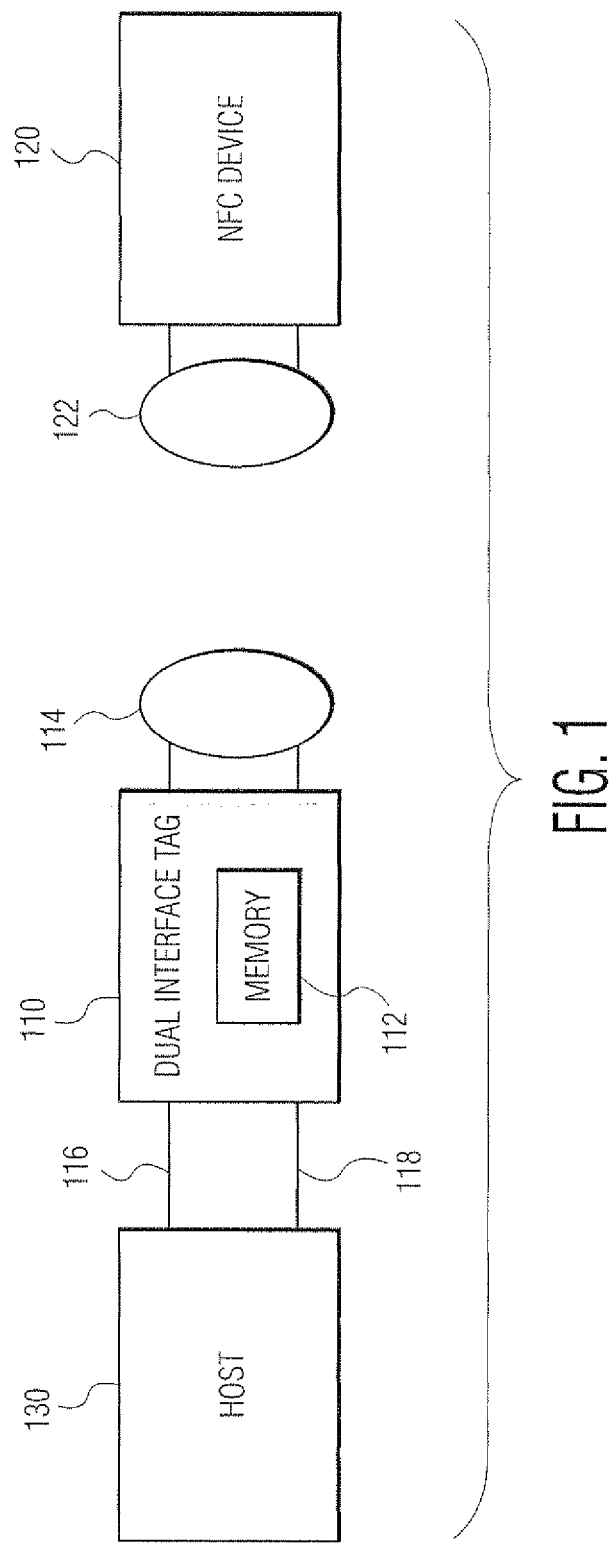
FIG. 1 illustrates an exemplary environment for a dual interface tag.

Referring now to the drawings, in which like numerals refer to like components or steps, there are disclosed broad aspects of various exemplary embodiments.

FIG. 1 illustrates an exemplary environment for a dual interface tag 110. Tag 110 may be a contactless tag that also includes a wired interface. Tag 110 may be in communication with NFC device 120 and host 130. Tag 110 may communicate with one or more NFC devices 120 via a wireless link such as, for example, RF signals. Tag 110 may communicate with host 130 via a wired interface. Accordingly, tag 110 may be physically connected to host 130. Tag 110 may be embedded within host 130 or attached to a surface of host 130. Tag 110 may also be removably connected to host 130, such as, for example, by plugging into a port of host 130.

Tag 110 may be an integrated circuit that stores information in an internal memory 112 that can be read by an external device such as NFC device 120. Tag 110 may be compliant with NFC Forum specifications for NFC Forum tags. Accordingly, tag 110 may receive and process a common set of commands used by NFC Forum tags. Tag 110 may also be read by host 130. Tag 110 may include memory 112, RF interface 114, wired interface 116, and field detection pin 118. Tag 110 may lack an internal power source and be powered by an external interface. For example, tag 110 may receive power via the RF interface 114 as a passive RFID tag and also receive power via a wired interface 116.

Memory 112 may include volatile memory and/or non-volatile memory. In various exemplary embodiments, memory 112 includes a non-volatile electronically erasable programmable read only memory (EEPROM). An EEPROM may continue to store data when tag 110 is no longer powered. Memory 112 may be arranged in a plurality of blocks having a fixed number of bytes. In various exemplary embodiments, memory 112 is arranged according to one of the NFC Forum tag specifications.

RF interface 114 may include hardware for transmitting and receiving data via radio frequency signals. Accordingly, RF interface 114 may include an antenna, transmitter, receiver, and/or transceiver. RF interface 114 may be compliant with the NFC Forum specifications and operate accordingly. RF interface 114 may be used by NFC device 120 to read and/or write data to memory 112.

Wired interface 116 may include one or more wires connecting NFC tag 110 to host 130. In various exemplary embodiments, wired interface 116 may be an inter-integrated circuit ($I^2C$) interface. Such a wired interface will be described in further detail below. Any other wired interface for communicating data may also be used. Wired interface 116 may be assigned a slave address for NFC tag 110. Wired interface 116 may be used by host 112 to read and/or write data to memory 112.

Field detection (FD) pin 118 may be an output pin of tag 110. FD pin 118 may indicate whether tag 110 is currently busy on RF interface 114. FD pin 118 may be connected to host 130. In various embodiments, FD pin 118 may be used to provide a trigger signal that causes an interrupt on host 130. Such a trigger signal may indicate that data is available for reading on tag 110. FD pin 118 may also allow host 130 to know when tag 110 is available for reading and/or writing via wired interface 116.

NFC device 120 may be any device capable of communicating with tag 110 via RF interface 114. In various exemplary embodiments, NFC device 120 may communicate with tag 110 as defined by NFC Forum specifications. NFC device 120 may be a cell phone, mobile phone, smart phone, tablet computer, PDA, or any other computing device.

RF interface 122 may include hardware for transmitting and receiving data via radio frequency signals. Accordingly, RF interface 122 may include an antenna, transmitter, receiver, and/or transceiver. RF interface 122 may be compliant with the NFC Forum specifications and operate accordingly. RF interface 122 may be used by NFC device 120 to read and/or write data to memory 112.

Host 130 may be any device capable of communicating via a wired interface 116. Accordingly, host 130 may be a computing device such as a cell phone, mobile phone, smart phone, tablet, laptop, or desktop computer, or any other computing device. Host 130 may also include other electronic devices. For example, host 130 may include a Bluetooth headset, speakers, video player, or any other electronic device. Dual interface tag 110 may be connected to host 130 and extend the functionality of host 130 for wireless communications such as NFC.

Figure 2:
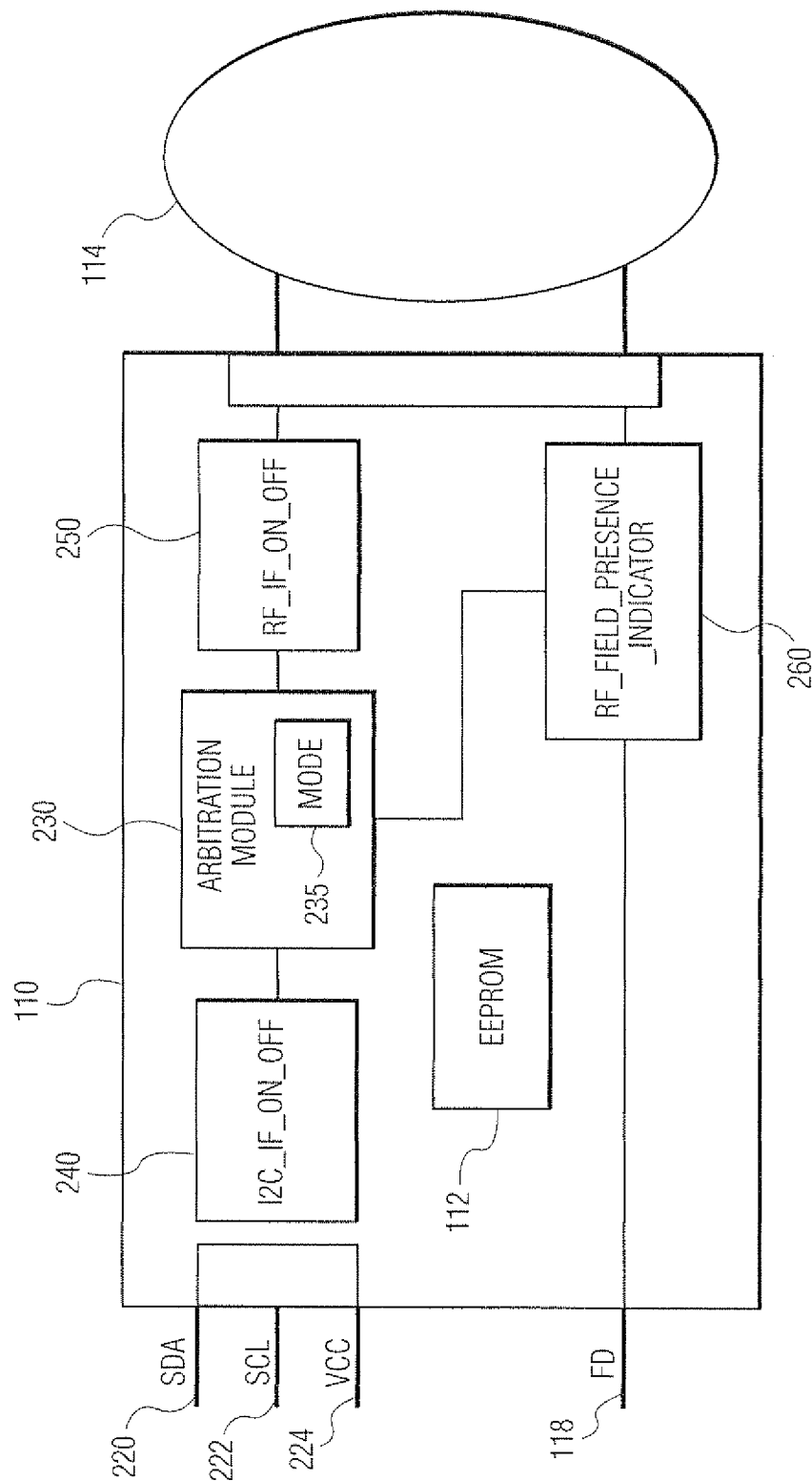
FIG. 2 illustrates an exemplary dual interface tag.

FIG. 2 illustrates an exemplary dual interface tag 110. Dual interface tag 110 may include: RF interface 114, field detection pin 118, SDA pin 220, SCL pin 222, VCC pin 224, EEPROM 112, arbitration module 230, I2C_IF_ON_OFF register 240, RF_IF_ON_OFF register 250, and RF_FIELD_PRESENCE_INDICATOR register 260.

SDA pin 220 may be a component of wired interface 116. For example, an SDA wire is defined for an $I^2C$ interface. SDA pin 220 may carry data and addresses for wired interface 116.

SCL pin 222 may be a component of wired interface 116. For example, an SCL wire is defined for an $I^2C$ interface. SCL pin 222 may provide a clock signal for the wired interface 116. The clock signal may determine the transmission speed of the wired interface 116.

VCC pin 224 may be a component of wired interface 116. VCC pin 224 may provide power to the tag 110. Accordingly, tag 110 may operate when powered solely via the wired interface 116.

Memory 112 may be an electronically erasable programmable read only memory (EEPROM). Memory 112 may be used by tag 110 to store data. Access to memory 112 may be controlled. For example, memory 112 may be set to a Read-only state such that it cannot be erased or written. Access to memory 112 may also be controlled by arbitration module 230 as discussed in further detail below.

Arbitration module 230 may include logic circuitry and/or instructions executable by an arithmetic logic unit (ALU) or processor. Arbitration module 230 may control access to tag 110. Arbitration module 230 may prevent concurrent access to the memory 112 by more than one interface. Arbitration module 230 may determine which interface may access the tag 110. Arbitration module 230 may transition tag 110 between various access states. In an idle state, either interface may gain access to tag 110. In an RF locked state, tag 110 may be locked to the RF interface 114 and the wired interface 116 may be blocked from access. In a wired locked state, tag 110 may be accessed via wired interface 116 and RF interface 114 may be blocked.

Arbitration mode indicator 235 may include a register, flag, or memory configured to indicate an arbitration mode of tag 110. The arbitration mode may determine how arbitration module 230 determines which interface may access tag 110 or how arbitration module 230 transitions between access states. In various exemplary embodiments, arbitration mode indicator 235 may be set during a test of tag 110. In various alternative embodiments, arbitration mode indicator 235 may be set via one or more interfaces.

I2C_IF_ON_OFF register 240 may be a register configured to indicate whether wired interface 116 is in use. Register 240 may be set or reset by wired interface 116. Register 240 may be set when tag 110 is addressed via wired interface 116. Register 240 may be reset when tag 110 receives an invalid address via wired interface 116, when tag 110 receives an instruction to reset register 240, or when wired interface 116 loses power, that is, when VCC 224 is off.

RF_IF_ON_OFF register 250 may be a register configured to indicate whether RF interface 114 is in use. Register 250 may be set or reset by RF interface 114. In a first arbitration mode, register 250 may be set according to FD pin 118. Register 250 may indicate that RF 114 is in use whenever an RF field is detected by tag 110. In a second arbitration mode, register 250 may be set or reset by commands from RF interface 114. Register 250 may be set when tag 110 receives a valid command via the RF interface 114. Register 250 may be reset when tag 110 is set to a HALT state via a HALT command received via the RF interface 114 or when tag 110 has an RF power on reset due to lack of an RF field.

RF_FIELD_PRESENCE_INDICATOR 260 may be a register configured to indicate the status of FD pin 118. Register 260 may provide a convenient access point to determine the status of the FD pin 118. For example, if host 130 is not connected to FD pin 118, host 130 may read the status of register 260 via wired interface 116.

Figure 3:
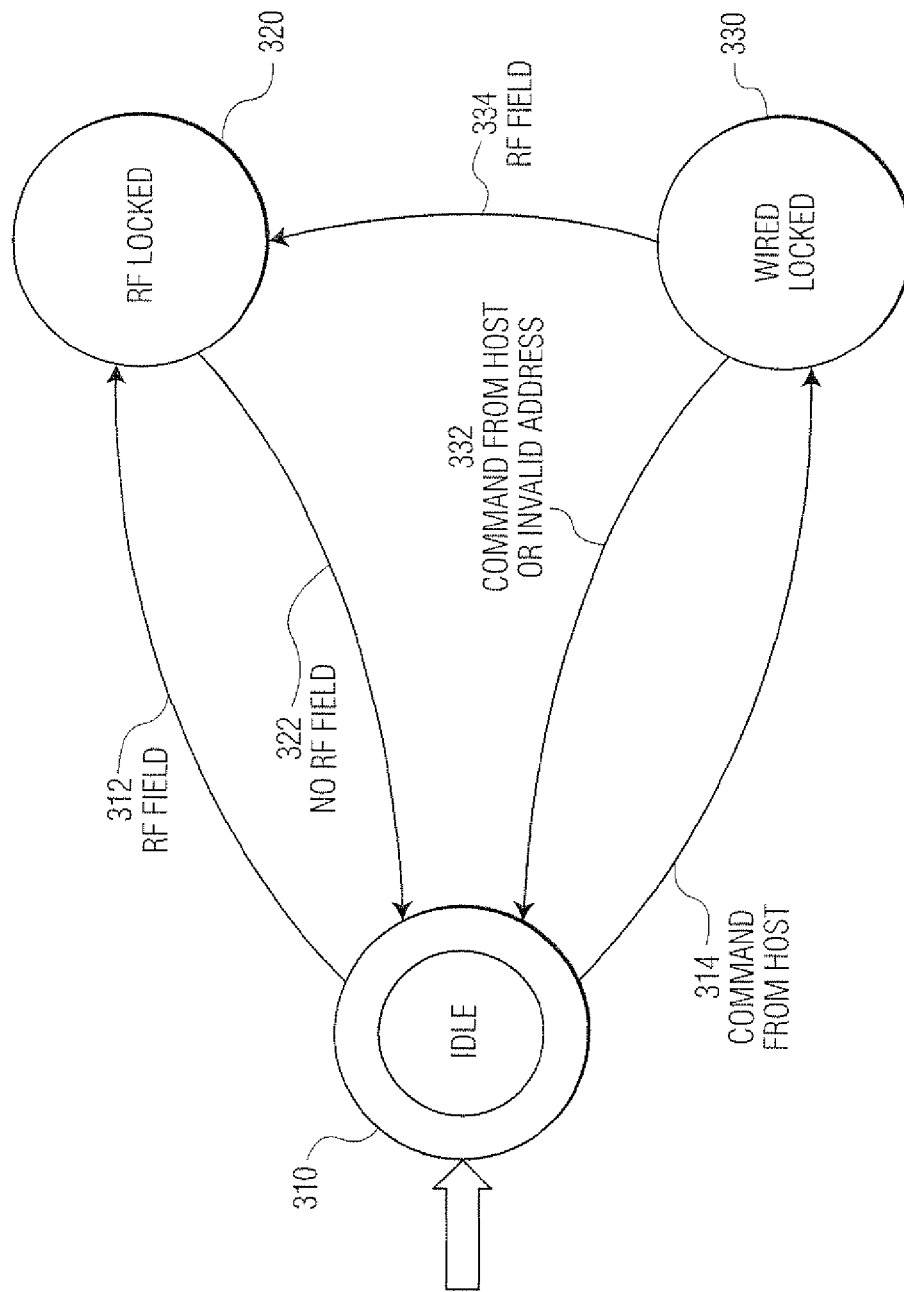
FIG. 3 illustrates a state diagram showing various states of the dual interface tag in a first arbitration mode.

FIG. 3 illustrates a state diagram showing various exemplary states for tag 110 in a first arbitration mode. Tag 110 may start in an idle state 310. In the idle state 310 both interfaces 114 and 116 may be inactive. Registers 240, 250, and 260 may all be set to 0, indicating that the respective interfaces are inactive. Tag 110 may be accessible to whichever interface is first to attempt to access tag 110.

Tag 110 may transition from idle state 310 to RF locked state 320 via transition path 312. Transition path 312 may occur when tag 110 detects an RF field. FD pin 118 may turn on indicating an RF field is present. RF_IF_ON_OFF register 250 may automatically be set to 1, indicating the RF interface 114 is now busy. In RF locked state 320, RF interface 114 may be able to access resources of tag 110. For example, an NFC device 120 may be able to read memory 112. Wired interface 116 may be blocked from access. Tag 110 may ignore any communications received via wired interface 116.

Tag 110 may transition from RF locked state 320 to idle state 310 via transition path 322. Transition path 322 may occur when tag 110 leaves the RF field or the RF field is turned off. In either case, tag 110 may no longer detect an RF field and FD pin 118 may be off. RF_IF_ON_OFF register 250 may automatically be set to 0, indicating that the RF interface 114 is not busy.

Tag 110 may transition from idle state 310 to wired locked state 330 via transition path 314. Transition path 314 may occur when tag 110 receives a command via wired interface 116. For example, wired interface 116 may be addressed according to its slave address on an I²C interface. Arbitration module 230 may set I2C_IF_ON_OFF interface 240 to 1, indicating that the wired interface 116 is busy.

In wired locked state 330, the resources of tag 110 may be accessible via the wired interface 116. For example, a host 130 may send commands to read or write memory 112. The host 130 may also be able to write to I2C_IF_ON_OFF register 240. RF interface 114 may be blocked from accessing tag 110. Tag 110 may not respond to an RF signal when it is in wired locked state 330.

Tag 110 may transition from wired locked state 330 to idle state 310 via transition path 332. Transition path 332 may occur when tag 110 receives a command to reset I2C_IF_ON_OFF register 240. For example, host 130 may send a command to write a 0 to I2C_IF_ON_OFF register 240. Alternatively, I2C_IF_ON_OFF register 240 may be reset when tag 110 receives an invalid address on wired interface. For example, a different node is addressed via wired interface 116. Another possible way to reset I2C_IF_ON_OFF register 240 is when wired interface 116 loses power. That is, when VCC pin 224 turns off, I2C_IF_ON_OFF register 240 may be set to 0 automatically, or by arbitration module 230.

Tag 110 may transition from wired locked state 320 directly to RF locked state 320 via transition path 334. Transition path 334 may occur when tag 110 detects an RF field while in wired locked state 330. FD pin 118 may indicate that an RF field is present, and RF_IF_ON_OFF register 250 may automatically be set to 1. Tag 110 may temporarily indicate that it is busy on both the wired interface 116 and RF interface 114. Arbitration module 230 may reset the I2C_IF_ON_OFF register 240 to 0 based on the detected RF field. In various embodiments, tag 110 may remain in wired locked state 330 until a most recent command received via wired interface 116 is completed, then follow transition path 334.

Figure 4:
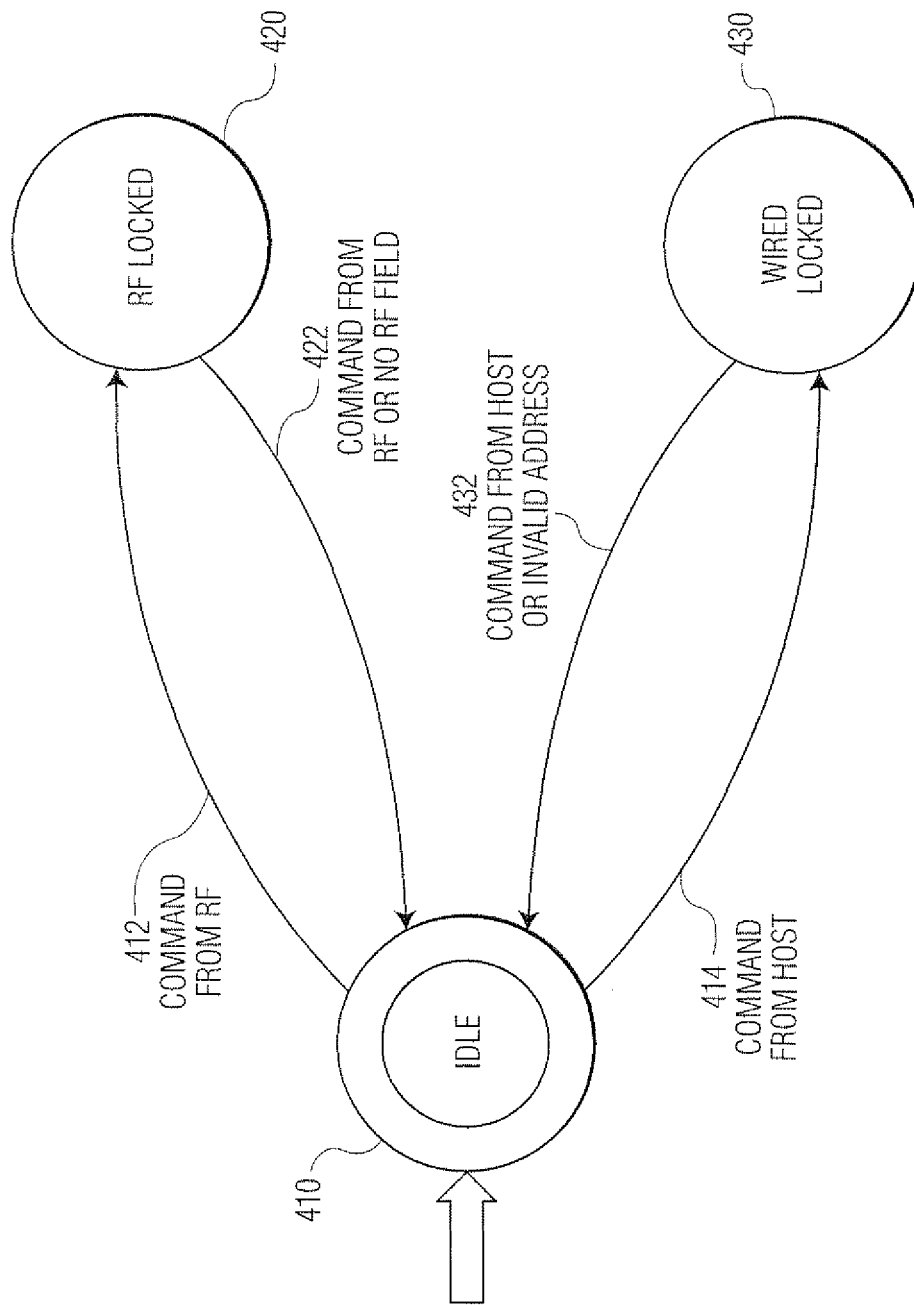
FIG. 4 illustrates a state diagram showing various states of the dual interface tag in a second arbitration mode.

FIG. 4 illustrates a state diagram showing various exemplary states for tag 110 in a second arbitration mode. The states 410, 420, and 430 may respectively correspond to states 310, 320 and 330 discussed above regarding FIG. 3. Transition paths 414 and 432 may be similar to transition paths 314 and 332, respectively. The second arbitration mode may include no equivalent to transition path 334. In other words, the second arbitration mode may provide no transition between a wired locked state 430 and an RF locked state 420. Instead, tag 110 may change interfaces only by returning to the idle state.

Tag 110 may transition from idle state 410 to RF locked state 420 via transition path 412. Transition path 412 may occur when tag 110 receives a valid command via RF interface 114. For example, tag 110 may receive a polling command, read command, or write command from an NFC device 120. Arbitration module 230 may set RF_IF_ON_OFF register 250 to 1, indicating that the RF interface 114 is busy.

Tag 110 may transition from RF locked state 420 to idle state 410 via transition path 422. Transition path 422 may occur when tag 110 receives a command via RF interface 110. Specifically, tag 110 may receive a HALT command. Arbitration module 230 may reset the RF_IF_ON_OFF register 250 to 0, indicating the RF interface 114 is no longer busy. Alternatively, similar to the first arbitration mode, transition path 422 may also occur when tag 110 is removed from the RF field or the RF field is turned off. FD pin 118 may turn off and arbitration module 230 may reset RF_IF_ON_OFF register 250 to 0.

Tag 110 may transition from idle state 410 to wired lock state 430 via transition path 414. Transition path 414 may be identical to transition path 314 described above.

Tag 110 may transition from wired lock state 430 to idle state 410 via transition path 432. Transition path 432 may be identical to the transition path 332 described above.

According to the foregoing, various exemplary embodiments provide a dual interface tag and method of controlling access to the dual interface tag. In particular, by locking access to the first interface that attempts to access the tag, an arbitration module may enable access via at least two interfaces and prevent corruption of data stored on the tag.

It should be apparent from the foregoing description that portions of various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. An integrated circuit (IC) comprising:
a memory;
a radio frequency (RF) interface configured to access the memory;
a wired interface connected to a host and configured to access the memory; and
an arbitration module comprising first and second registers that is configured to determine which of the RF interface or the wired interface may access the memory based upon an idle state, a wired lock state, and a RF locked state, wherein either the RF interface or the wired interface may access the IC in the idle state, the first register is configured to indicate a status of the RF interface, and the second register is configured to indicate a status of the wired interface.

2. The IC of claim 1, further comprising:
a field detection (FD) pin that indicates whether an RF field is present.

3. The IC of claim 1, wherein the arbitration module is configured to block communication via the wired interface if the first register indicates that the RF interface is active and to block communication via the RF interface if the second register indicates that the wired interface is active.

4. The IC of claim 1, further comprising:
a field detection (FD) pin that indicates whether an RF field is present, wherein the arbitration module is configured to set the first register when the FD pin indicates that the RF field is present.

5. The IC of claim 4, wherein the arbitration module waits until the second register indicates that the wired interface is inactive before blocking the wired interface.

6. The IC of claim 4, wherein the arbitration module is configured to reset the first register when the FD pin indicates that no RF field is present.

7. The IC of claim 1, wherein the arbitration module is configured to control the first register based on commands received via the RF interface.

8. The IC of claim 1, wherein the arbitration module is configured to control the second register based on an address received via the wired interface.

9. The IC of claim 1, wherein the arbitration module is configured to control the second register based on commands received via the wired interface.

10. The IC of claim 1, wherein the wired interface is an integrated inter-circuit ($I^2C$) interface.

11. The IC of claim 1, wherein the arbitration module is configured to prevent concurrent access to a dual interface tag by more than one interface.

12. A method of controlling access in a dual interface tag having a wired interface and a radio frequency (RF) interface that are configured to operate in an idle state, a wired lock state, and a RF locked state, the method comprising:
transitioning from the idle state to the wired lock state based on a first communication received via the wired interface by receiving an address via the wired interface, determining that the address is a slave address of the tag on the wired interface, and setting a register associated with the wired interface to indicate that the wired interface is busy;
transitioning from the wired lock state to the idle state based on a second communication received via the wired interface or a lack of power on the wired interface;
transitioning from the idle state to the RF locked state based on a status of the RF interface;
transitioning from the RF locked state to the idle state based on the status of the RF interface; and
determining which of the RF interface or the wired interface may access the dual interface tag, wherein either the RF interface or the wired interface may access the dual interface tag in the idle state and each interface has a separately indicated status.

13. The method of claim 12, further comprising:
transitioning from the wired lock state to the RF locked state based on detection of an RF field.

14. The method of claim 12, wherein the status of the RF interface is based on presence of an RF field.

15. The method of claim 12, wherein the status of the RF interface is based on commands received via the RF interface.

16. The method of claim 12, wherein the step of transitioning from the idle state to the RF locked state based on the status of the RF interface comprises:
setting a register associated with the RF interface based on presence of a RF field.

17. The method of claim 12, wherein the step of transitioning from the RF locked state to the idle state based on the status of the RF interface comprises:
  receiving a HALT message via the RF interface; and
  resetting a register associated with the RF interface to indicate that the RF interface is not busy.

18. The method of claim 12, wherein the wired interface and the RF interface cannot concurrently access the dual interface tag.

19. A method of controlling access in a dual interface tag having a wired interface and a radio frequency (RF) interface that are configured to operate in an idle state, a wired lock state, and a RF locked state, the method comprising:
  transitioning from the idle state to the wired lock state based on a first communication received via the wired interface;
  transitioning from the wired lock state to the idle state based on a second communication received via the wired interface or a lack of power on the wired interface;
  transitioning from the idle state to the RF locked state based on a status of the RF interface;
  transitioning from the RF locked state to the idle state based on the status of the RF interface; and
  determining which of the RF interface or the wired interface may access the dual interface tag, wherein either the RF interface or the wired interface may access the dual interface tag in the idle state, a first register in an arbitration module is configured to indicate a status of the RF interface, and a second register in the arbitration module is configured to indicate a status of the wired interface.

* * * * *